Sept. 20, 1927.

E. A. HAGBERG

CLOTHES BASKET CART

Filed March 13, 1925

1,642,731

INVENTOR:
Edward A. Hagberg
BY David E. Carlsen
ATTORNEY.

Patented Sept. 20, 1927.

1,642,731

UNITED STATES PATENT OFFICE.

EDWARD A. HAGBERG, OF ST. PAUL, MINNESOTA.

CLOTHES-BASKET CART.

Application filed March 13, 1925. Serial No. 15,243.

My invention relates to push carts in general and more specifically to a cart designed for transporting clothes baskets from the place where the clothes have been washed to where they are to be hung on lines to dry.

The object is to provide a simple, efficient and inexpensive device readily collapsed into a very small space when not in use and is conveniently and quickly set up for use.
In the accompanying drawing.

Figure 4:
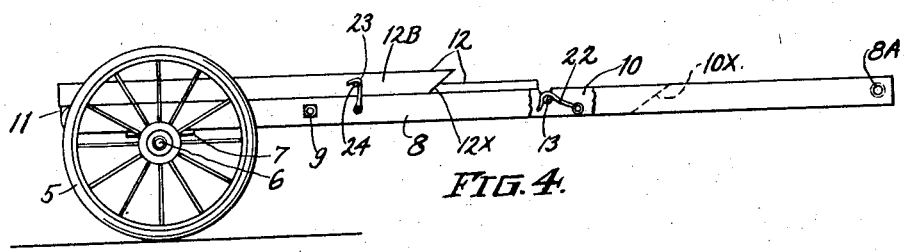

Fig. 4 is a side view of the cart collapsed.
Referring to the drawing by reference numerals, 5 designates a pair of supporting ground wheels on an axle 6. 7 are two bearings for axle 6 each secured to the lower end of a bar 8, the upper ends of said two bars being connected by a transverse handle bar 8$^A$. The bars 8 and 8$^A$ thus form a U-frame. In said U-frame I mount pivotally on a shaft 9 a secondary U-frame oppositely disposed to the main U-frame and comprising two parallel bars 10 the forward ends of which are connected by a transverse cleat 11 having a pivot pin 11$^A$ at each end engaging the front or upper end of a bar 10.

Figure 1:
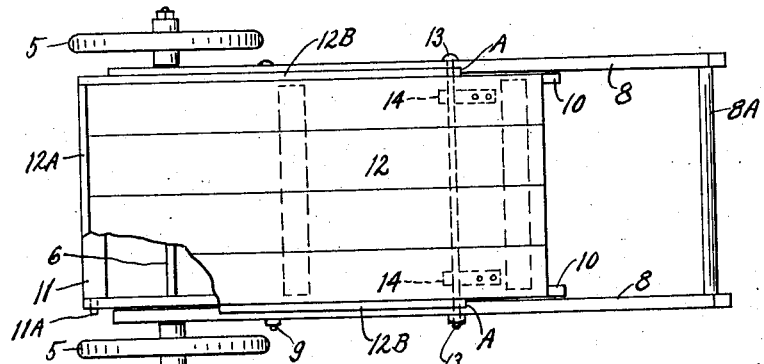
Fig. 1 is a top view of the simplest form of my device.
Figure 2:
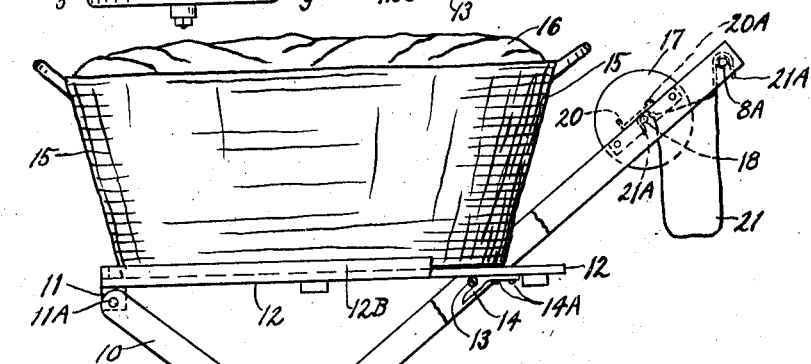
Fig. 2 is a side elevation of Fig. 1, slightly modified, and showing a clothes basket resting on the tray of the device.

The cleat 11 is fixed to and supports the front end of a tray 12, the latter preferably of elongated quadrangular form. 12$^A$ is a vertically disposed flange on the front end of the tray and 12$^B$ are like side flanges extending rearwardly and each of the latter having an angular rear terminus as 12$^X$ for a purpose to be described. 13 is a cross bar in the main U-frame located so as to support the rear end of the tray 12 horizontally and be engaged by one or more hook members 14 secured as at 14$^A$ on the under side of the tray (see Figs. 1 and 2).

When the device is in operative or set up position (Figs. 1 and 2) the tray 12 is in a horizontal plane, the wheel supported main U-frame projects upward and rearwardly and the smaller U-frame extends rearwardly and downwardly from cleat 11 to the ground the rear ends of bars 10 being cut at an angle to provide a maximum bearing surface, as 10$^X$ in Figs. 2 and 4. Thus the U-frames form an X-shaped support for tray 12 the latter being in horizontal plane and the hook 14 engaging bar 13 prevents the U-frames from spreading. In this operative position the tray projects rearwardly between the bars 8 of the main U-frame and the sloping surfaces 12$^X$ of each side member 12$^B$ may engage the upwardly exposed edge of each member 8 as at A in Fig. 1.

In the operative position above described a clothes basket 15 full of washed clothes 16 may be placed on tray 12 and the device is ready to be moved to a place where the clothes are to be hung up. It is well known that laundresses and housewives hanging up clothes usually place the basket on the ground and then proceed to hang up the clothes on lines. Many trips are required between the basket and the lines and the distance increases as the work progresses or the basket must be moved from time to time. With my device the basket is kept high and dry above the ground and is readily moved along and kept within easy reach of where the clothes are being hung up.

Figure 3:
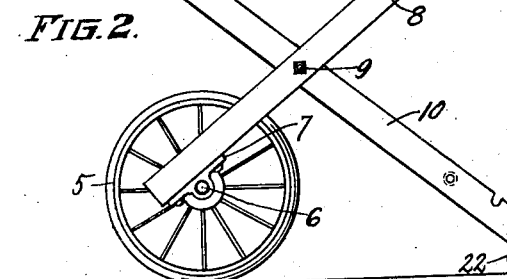
Fig. 3 is a face view of the upper end of the handle bar 8—8$^A$ showing more clearly the clothes line reel and pin-bag features.
Figure 3:
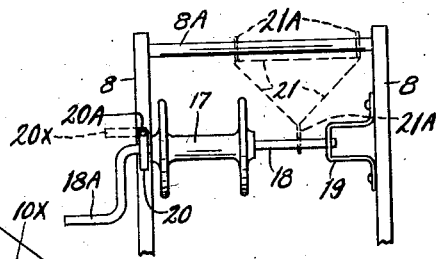

To increase the efficiency of my device I mount a clothes-line reel 17 secured on shaft 18 rotatable in a bracket 19 fixed on one bar 8, and a notch in the other bar 8. 18$^A$ is a hand crank for turning the reel and is preferably made of an extension of shaft 18 (see Fig. 3). The notch is normally closed by a latch 20 pivoted as at 20$^A$ and may be swung back as to 20$^X$ (Fig. 3) permitting the reel to be removed if so desired.

21 is a clothes-pin bag with hooks 21$^A$ adapted to engage the handle bar 8$^A$ and shaft 18 simultaneously and be suspended therefrom in open condition.

The device may readily be folded up in a small space. The smaller U-frame may be swung into the plane of the large U-frame, it being understood that the hooks 14 are first disengaged from bar 13; the tray 12 then rests upon the folded U-frames, as in Fig. 4. 22 is a hook member secured on the inner side of either or both U-frame bars 10 and located so that when the device is folded up this hook may be used to engage shaft 13 of U-frame 8 and hold the two frames locked together. In Fig. 4 I have shown also a hook 23 secured on the outer side of bar 8 and adapted to engage a pin 24 suitably located on the side member 12^B of the tray to hold the device in folded condition.

What I claim is:

In a clothes basket cart having a tray-like platform, a long forwardly and downwardly directed U-frame, a short U-shaped frame, both said U-frames mounted on a common pivot and adapted to support the tray in elevated horizontal position, one end of said long U-shaped frame extending above the level of the tray, wheels mounted on the lower end of said long frame, a clothesline reel arranged transversely and near one side of the upper end of said long U-frame, and a clothes-pin holder removably mounted in accessible position adjacent said reel.

In testimony whereof I affix my signature.

EDWARD A. HAGBERG.